(12) United States Patent
Baumann et al.

(10) Patent No.: US 8,978,219 B2
(45) Date of Patent: Mar. 17, 2015

(54) MACHINE TOOL

(75) Inventors: Ulrich Baumann, Lenningen (DE); Heinz Forst, Aichwald (DE)

(73) Assignee: Index-Werke GmbH & Co. KG Hahn & Tessky, Esslingen (DE)

( * ) Notice: Subject to any disclaimer, the term of this patent is extended or adjusted under 35 U.S.C. 154(b) by 140 days.

(21) Appl. No.: 13/552,236

(22) Filed: Jul. 18, 2012

(65) Prior Publication Data
US 2013/0032012 A1 Feb. 7, 2013

(30) Foreign Application Priority Data

Jul. 19, 2011 (DE) .......................... 10 2011 051 950
Jan. 25, 2012 (DE) .......................... 10 2012 100 614

(51) Int. Cl.
| B23B 3/22 | (2006.01) |
| B23B 3/30 | (2006.01) |
| B23B 3/16 | (2006.01) |
| B23Q 1/48 | (2006.01) |
| B23Q 39/02 | (2006.01) |
| B23Q 39/00 | (2006.01) |

(52) U.S. Cl.
CPC . *B23B 3/30* (2013.01); *B23B 3/168* (2013.01); *B23Q 1/4857* (2013.01); *B23Q 39/026* (2013.01); *B23Q 2039/004* (2013.01)
USPC ................................................ 29/40; 82/121

(58) Field of Classification Search
USPC ............ 82/120, 121, 138, 137; 29/41, 43, 54, 29/40
See application file for complete search history.

(56) References Cited

U.S. PATENT DOCUMENTS

| 3,486,209 | A | * | 12/1969 | Shultz et al. | .................. | 29/27 R |
| 5,214,829 | A | * | 6/1993 | Minagawa | ..................... | 29/27 C |
| 5,313,694 | A | * | 5/1994 | Yonemoto et al. | ............ | 29/27 R |
| 5,490,307 | A | | 2/1996 | Link | | |
| 6,928,909 | B1 | * | 8/2005 | Akimoto et al. | ................ | 82/129 |
| 7,043,805 | B2 | * | 5/2006 | Tokuma et al. | ................ | 29/27 C |
| 8,074,543 | B2 | * | 12/2011 | Hyatt et al. | ..................... | 82/121 |
| 2008/0060491 | A1 | | 3/2008 | Hyatt et al. | | |
| 2008/0066592 | A1 | | 3/2008 | Yamane et al. | | |
| 2011/0162182 | A1 | | 7/2011 | Baumann | | |

FOREIGN PATENT DOCUMENTS

| DE | 10 2008 050656 A1 | 3/2010 |
| EP | 1 897 640 A1 | 3/2008 |
| WO | WO 2008/033850 A1 | 3/2008 |

* cited by examiner

*Primary Examiner* — Will Fridie, Jr.
(74) *Attorney, Agent, or Firm* — Reinhart Boerner Van Deuren P.C.

(57) ABSTRACT

A lathe is provided that can produce complex shapes. The lathe includes a turret movement system with a B axis, which can be activated by a control. The turret axis may be designed as an H axis, which extends in a place at right angles to the B axis and can be activated by the control.

10 Claims, 7 Drawing Sheets

MACHINE TOOL

This patent application claims the benefit of German applications No. 10 2011 051 950.5, filed Jul. 19, 2011 and No. 10 2012 100 614.8, filed Jan. 25, 2012, the teachings and disclosure of which are hereby incorporated in their entirety by reference thereto.

The invention relates to a lathe, comprising a machine frame, a workpiece spindle which is arranged on the machine frame and with which a workpiece is rotatable about a workpiece spindle axis, a workpiece receptacle for a workpiece rotatable about the workpiece spindle axis, at least one tool carrier system which is arranged on the machine frame and provided with a tool turret for accommodating a plurality of tools, wherein the tool turret comprises a turret housing and a turret head which is rotatable about a turret axis relative to the turret housing and bears the tools, at least one turret movement system, by means of which the turret housing of the tool turret and the workpiece receptacle can be moved relative to one another at least in an X direction and a Z direction, and a control, with which movement of the workpiece receptacle and the turret housing relative to one another can be controlled.

Lathes of this type are known from the state of the art.

The problem with them is that complex machining operations cannot be carried out with them or only very expensively.

The object underlying the invention is, therefore, to improve a lathe of the generic type in such a manner that workpieces with a complex shape can also be produced as simply and inexpensively as possible.

This object is accomplished in accordance with the invention, in a lathe of the type described at the outset, in that the turret movement system is provided with a B axis which can be activated by the control and that the turret axis is designed as an H axis which extends in a plane at right angles to the B axis and can be activated by the control.

The advantage of the solution according to the invention is, therefore, to be seen in the fact that it is possible as a result of the B axis and the H axis to align the tool, which is located in the operating position, relative to the workpiece in an optimum manner as a result of two additional rotary movements carried out in planes of alignment extending at right angles to one another.

A B axis is to be understood as an axis which extends at right angles to a plane which, for its part, is aligned parallel to an X axis and a Z axis of the lathe. The B axis extends, in particular, parallel to a Y axis.

With respect to the configuration of the rotation about the B axis, no further details have so far been given.

For example, the rotation about the B axis could be brought about in discrete steps and it would be conceivable, for example, to fix the rotary movement about the B axis in the many discrete rotary positions relative to one another by way of form locking.

One particularly advantageous solution provides, however, for the rotation about the B axis to be brought about by a rotary positioning system in a step-less and position-controlled manner, i.e. for the rotation about the B axis to be carried out through optional angles and, in particular, also at an optional speed which can be predetermined by the control, for example by its NC program, and, on the other hand, for no more fixing of the rotary movement about the B axis to be brought about by the position control but rather for the rotary position about the B axis to be maintained by a position-controlled rotary drive which is constantly in operation and so, as a result, it is also possible to compensate immediately for any faulty orientations, which may occur during machining, by means of the position-controlled rotary drive and so such faulty orientations cannot have any effect.

In addition to the position-controlled drive, a friction-locking fixing device could be provided for particularly difficult machining operations, for example in the form of a rotary brake.

One particularly favorable solution provides for the rotary positioning system to have a position-controlled rotary drive which drives a transmission gear which brings about a transmission to slow and by means of which the turret housing is rotatable.

The use of a transmission gear with transmission to slow has the advantage that, as a result, it is possible to maintain the different rotary positions of the turret housing via the position-controlled rotary drive even with large counterforces since the transmission gear has the effect that the retroaction of the momenta, which act on the turret head, via the turret housing on a rotary movement about the B axis results in a torque acting on the position-controlled rotary drive which is very much smaller and which the position-controlled rotary drive can counteract for all lathe work on account of the torque which can be generated by it and so no additional fixing device whatsoever, which could impair the accuracy of the rotary positioning about the B axis, is required for fixing the rotary movement about the B axis.

Such a transmission gear can be designed in the most varied of ways.

With respect to the mounting of the turret housing on the turret movement system, no further details have so far been given.

A separate mounting could be provided, for example, for the rotary movement.

One particularly advantageous solution provides for the transmission gear to rotatably mount the turret housing on the turret movement system and so the transmission gear represents, at the same time, the mounting for the turret housing on the turret movement system.

With respect to the alignment of the turret axis relative to the B axis, no further details have so far been given.

The turret axis could, for example, be aligned parallel to the B axis.

One particularly favorable solution provides for the turret axis to be located in a plane extending at right angles to the B axis.

Such a constellation is particularly favorable with a view to the possibility of utilizing the tools relative to the workpiece in an optimum manner.

With respect to the drive of the turret head about the turret axis relative to the turret housing, no further details have so far been given.

One advantageous solution provides, for example, for the turret head to be drivable and positionable about the H axis relative to the turret housing by a turret rotary positioning system in a step-less and position-controlled manner.

With respect to the turret positioning system, no further details have likewise been given thus far.

One advantageous solution provides, for example, for the turret positioning system to have a rotary drive which drives a transmission gear which brings about a transmission to slow and by means of which the turret head is rotatable about the turret axis.

So far, no further details have, in addition, been given concerning the mounting of the turret head on the turret housing.

For example, it would be conceivable to provide a separate mounting for the turret head on the turret housing which is independent of the transmission gear.

One particularly expedient solution provides for the transmission gear to rotatably mount the turret head on the turret housing.

With respect to the design of the transmission gear mentioned above, no further details have likewise been given thus far. The transmission gear could be a classic gear train or also a planetary gear.

For example, a cam gear, for example a so-called cyclogear or cycloidal gear, can be used as a transmission gear to slow.

Alternatively thereto, it is, however, also conceivable to use a so-called harmonic drive instead of a cyclo-gear.

All these gears have the advantage, apart from a large transmission to slow, that they are designed to absorb load peaks to a high degree and have a high rigidity. Moreover, these gears have the advantage that they have very little clearance.

With respect to the course of the turret axis designed as H axis in the space relative to the B axis, no details whatsoever have as yet been given.

In principle, it would be conceivable to align the turret axis such that it extends radially to the B axis.

For reasons of as compact a spatial construction as possible, it has, however, proven to be advantageous when the turret axis extends at a distance from the B axis.

In order to be able to exploit the possibilities of the solution according to the invention in an optimum manner, it is preferably provided for a movement space for the relative movement between a tool in operating position and the workpiece receptacle to be selected such that the tool can be brought, as a result of rotation about the B axis and the H axis, into a position, in which it can form an acute angle with the workpiece spindle axis in all the planes which extend through it.

Such a possibility of aligning the tool allows, on the one hand, a high flexibility during the machining of the workpiece, in particular in the case of complex shapes thereof.

In addition, it is particularly favorable, therefore, when the movement space for the relative movement between a tool in operating position and the workpiece receptacle is selected such that the tool can be aligned exactly parallel to the workpiece spindle axis as a result of rotation about the B axis and about the H axis.

Additional features and advantages of the invention are the subject matter of the following description as well as the drawings illustrating one embodiment.

Figure 1:
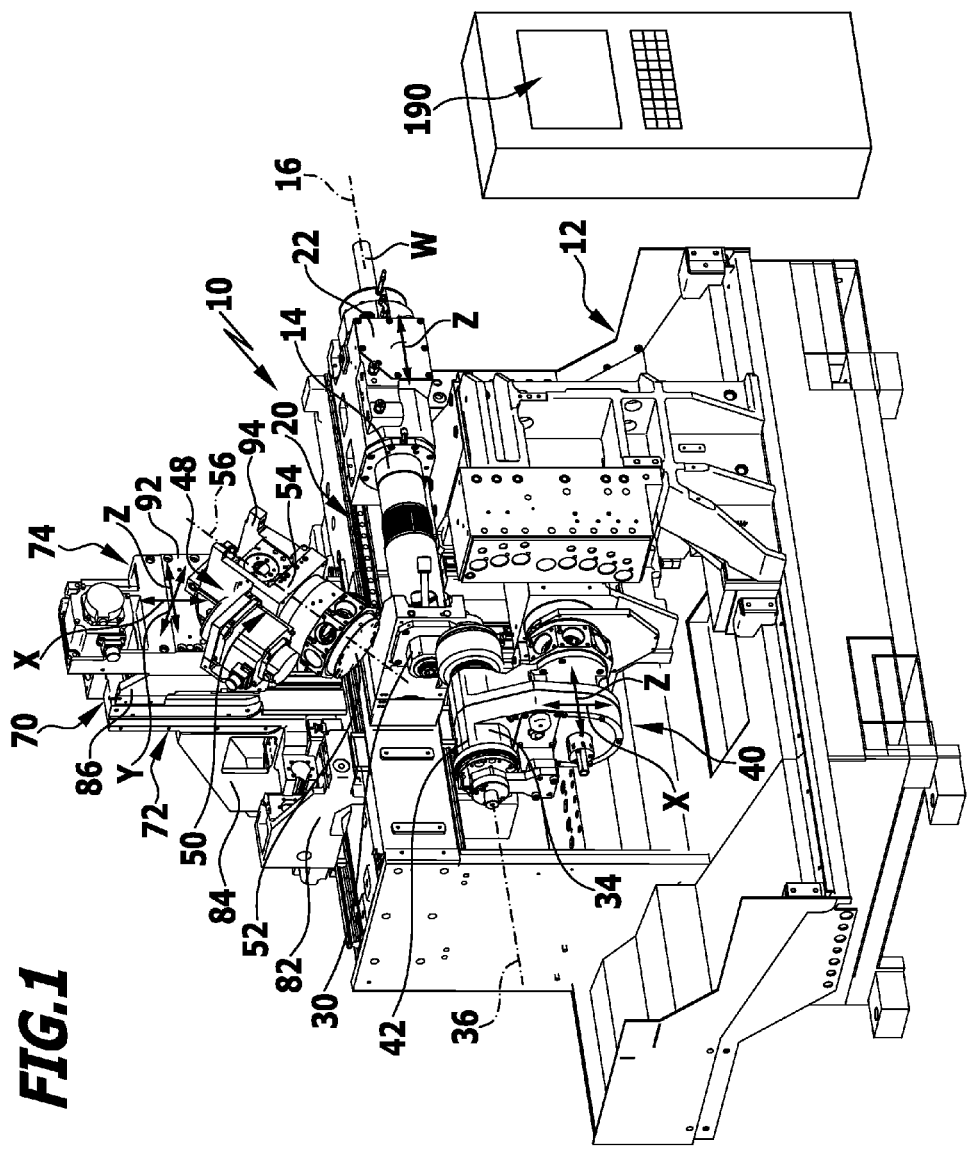
FIG. 1 shows a perspective illustration of one embodiment of a lathe according to the invention.

One embodiment of a lathe designated as a whole as 10, in this case, for example, a long turning lathe, comprises a machine frame which is designated as a whole as 12 and on which a first workpiece spindle 14 is held, with which a workpiece W, in this case a bar of material, can be rotatingly driven about a first workpiece spindle axis 16 and can be fixed in place against movements in the direction of the workpiece spindle axis 16.

In the embodiment illustrated, the first workpiece spindle 14 is mounted on the machine frame 12 for displacement in a Z direction parallel to the first workpiece spindle axis 16, wherein, for this purpose, a longitudinal guiding system 20, with which a workpiece spindle housing 22 which rotatably accommodates the workpiece spindle 14 is guided for displacement in the Z direction, is provided on the machine frame 12.

Since the embodiment of the lathe according to the invention and as illustrated is a long turning lathe, a long turning guide bushing 30 is also held stationarily on the machine frame 12 and this serves as a workpiece receptacle and, in particular, serves the purpose of guiding the workpiece W designed as a bar of material radially to the first workpiece spindle axis 16 close to a machining area BW (FIGS. 2 to 4), wherein the workpiece W is advanced relative to the long turning guide bushing 30 as a result of displacement of the first workpiece spindle 14 in the Z direction relative to the machine frame 12.

As a result, the machining area BW of the workpiece W, which projects beyond the long turning guide bushing 30 on a side located opposite the first workpiece spindle 14, can be machined by tools, wherein the forces acting transversely to the first workpiece spindle axis 16 are absorbed by the long turning guide bushing 30 while the machining area BW of the workpiece W migrates along the workpiece W to the extent at which the workpiece W is advanced in a Z direction relative to the long turning guide bushing 30 on account of displacement of the first workpiece spindle 14.

Moreover, a second workpiece spindle or counterspindle designated as a whole as 34 is provided on a side of the long turning guide bushing 30 facing away from the first workpiece spindle 14 and this second workpiece spindle, for its part, is arranged in a second workpiece spindle housing 42 so as to be rotatable about a second workpiece spindle axis 36 and has a workpiece receptacle 38 (FIG. 5) provided in the second workpiece spindle 34, wherein the second workpiece spindle housing 42 can be moved, for example, not only in a Z direction parallel to the first workpiece spindle axis 16 but also in an X direction at right angles to the first workpiece spindle axis 16 by a slide system designated as a whole as 40.

Figure 2:
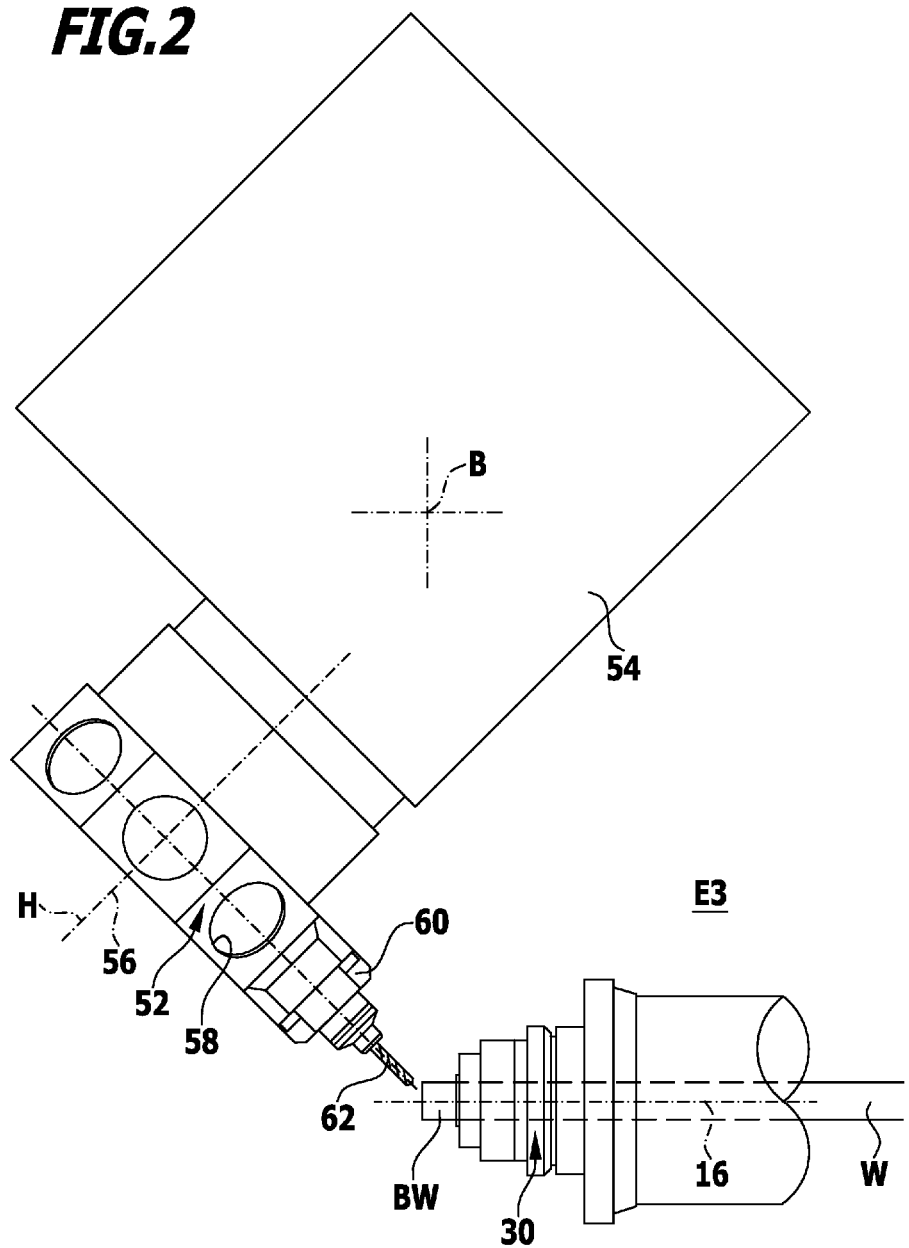
FIG. 2 shows a schematic illustration of an alignment of a tool in operating position relative to a workpiece spindle axis at an acute angle.
Figure 3:
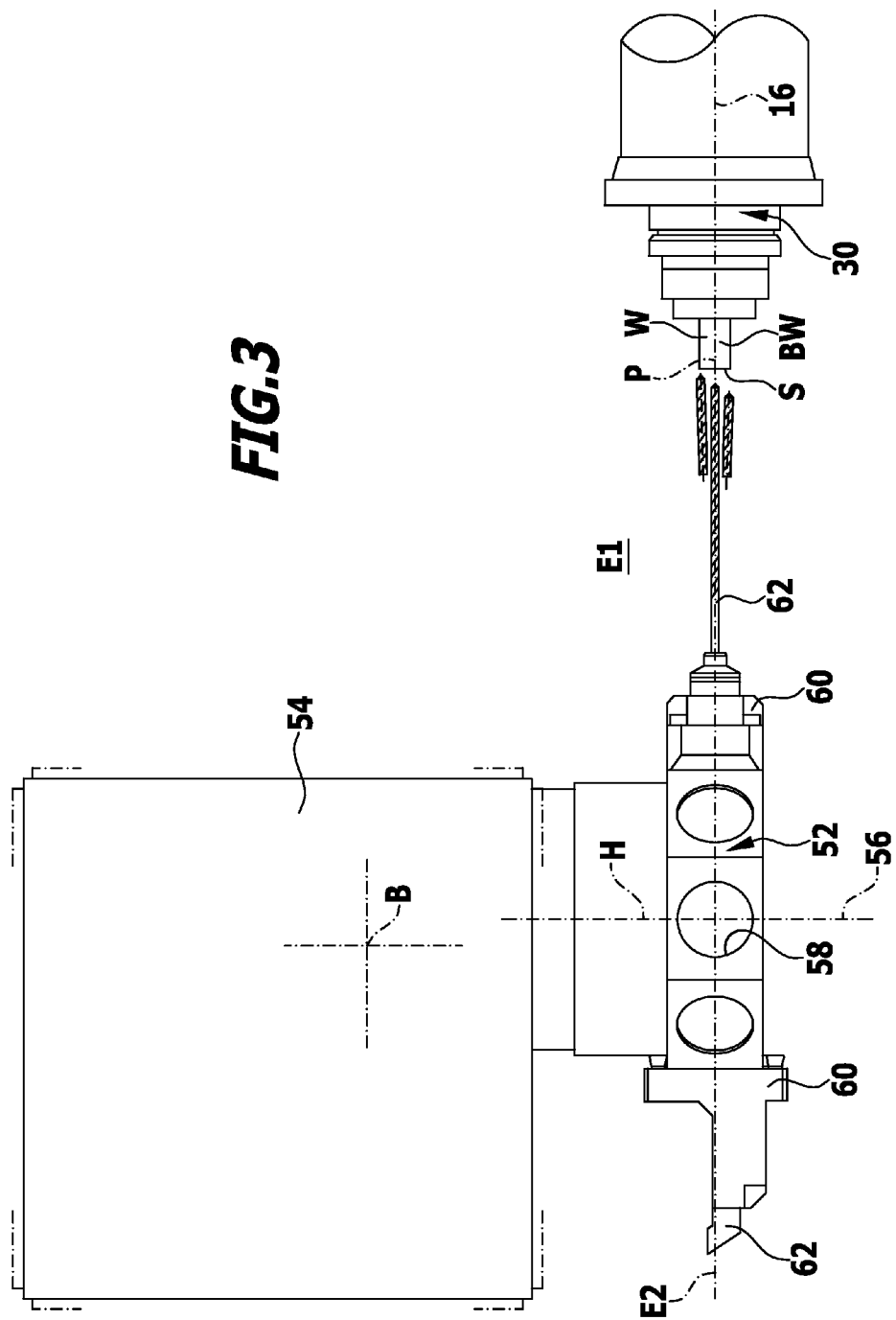
FIG. 3 shows a schematic illustration of an alignment of a tool in operating position parallel to the workpiece spindle axis.
Figure 4:
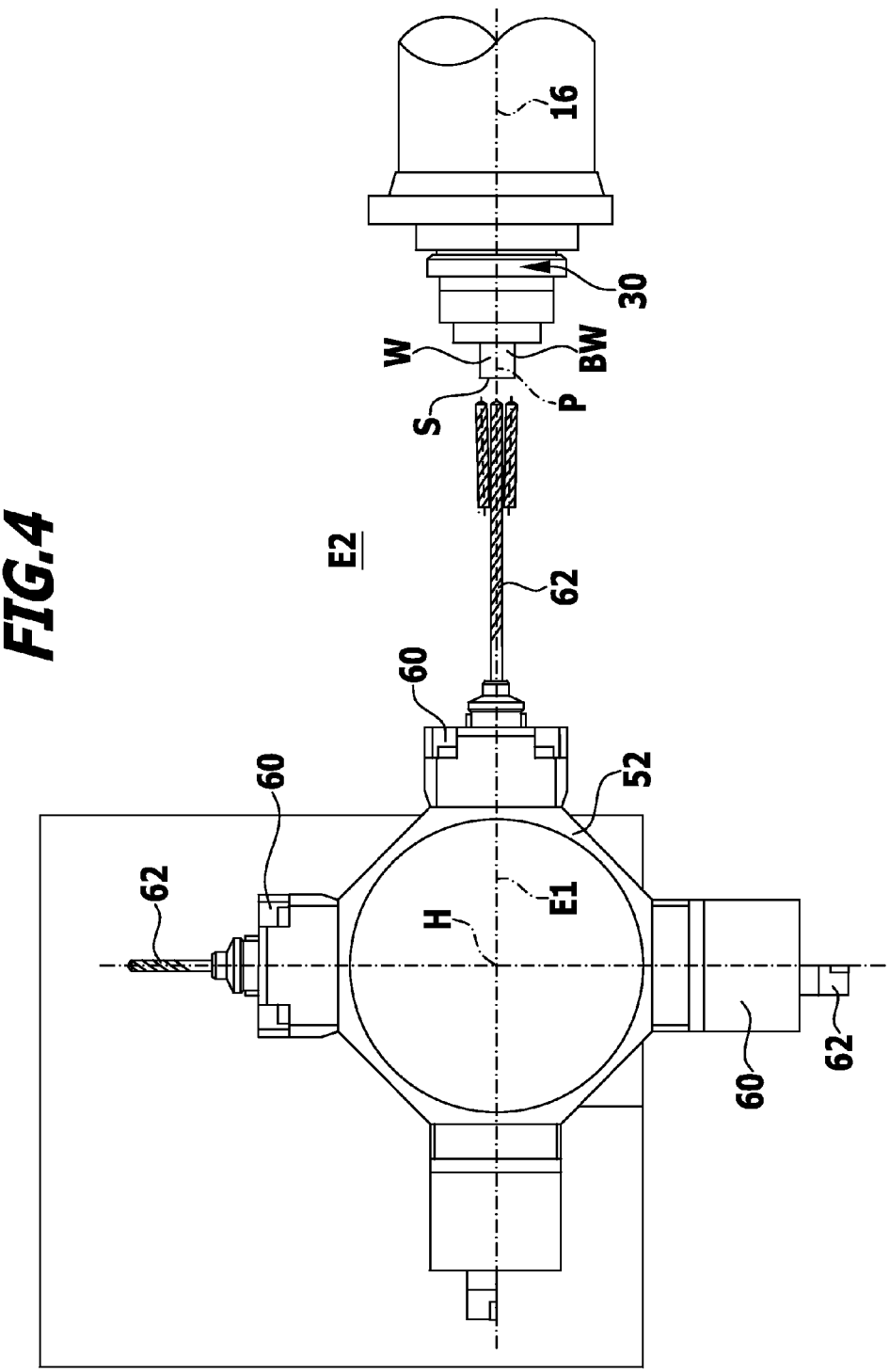
FIG. 4 shows a sectional view along line 4-4 in FIG. 3.

A tool carrier system designated as a whole as 48 is provided for the machining of the machining area BW of the workpiece W and comprises a tool turret 50 which has a turret head 52 which can be rotated relative to a turret housing 54 about a turret axis designated as a whole as 56, wherein the turret head 52 is provided with a plurality of tool receptacles 58, into which tool holders 60 can be inserted with tools 62 accommodated in them, for example illustrated in FIGS. 2 to 4, wherein the tools 62 can be designed either as driven tools or as stationary tools.

For the purpose of moving the tool turret 50 relative to the long turning guide bushing 30 or relative to the second workpiece spindle 34, the tool turret 50 is seated on a turret movement system which is designated as a whole as 70 and comprises a slide system 72 which, for its part, makes movement of the tool turret 50 relative to the machine frame 12 possible along a Z axis extending parallel to the first tool spindle axis 16, along an X axis extending transversely to the first workpiece spindle axis 16 and along a Y axis extending transversely to the X axis and to the first workpiece spindle axis 16.

It is, however, also conceivable to design the slide system 72 such that it allows only movement in the X direction and the Z direction and no movability in the Y direction is provided.

The slide system 72 bears, for its part, a rotary positioning system 74 of the turret movement system 70 which can be moved in the specified directions X, Y and Z by the slide system 72 and with which the entire tool turret 50 is rotatable about a B axis relative to the machine frame 12 and also relative to the slide system 72, wherein the B axis extends at right angles to the X axis and Z axis and preferably parallel to a Y axis, insofar as one is provided.

Figure 5:
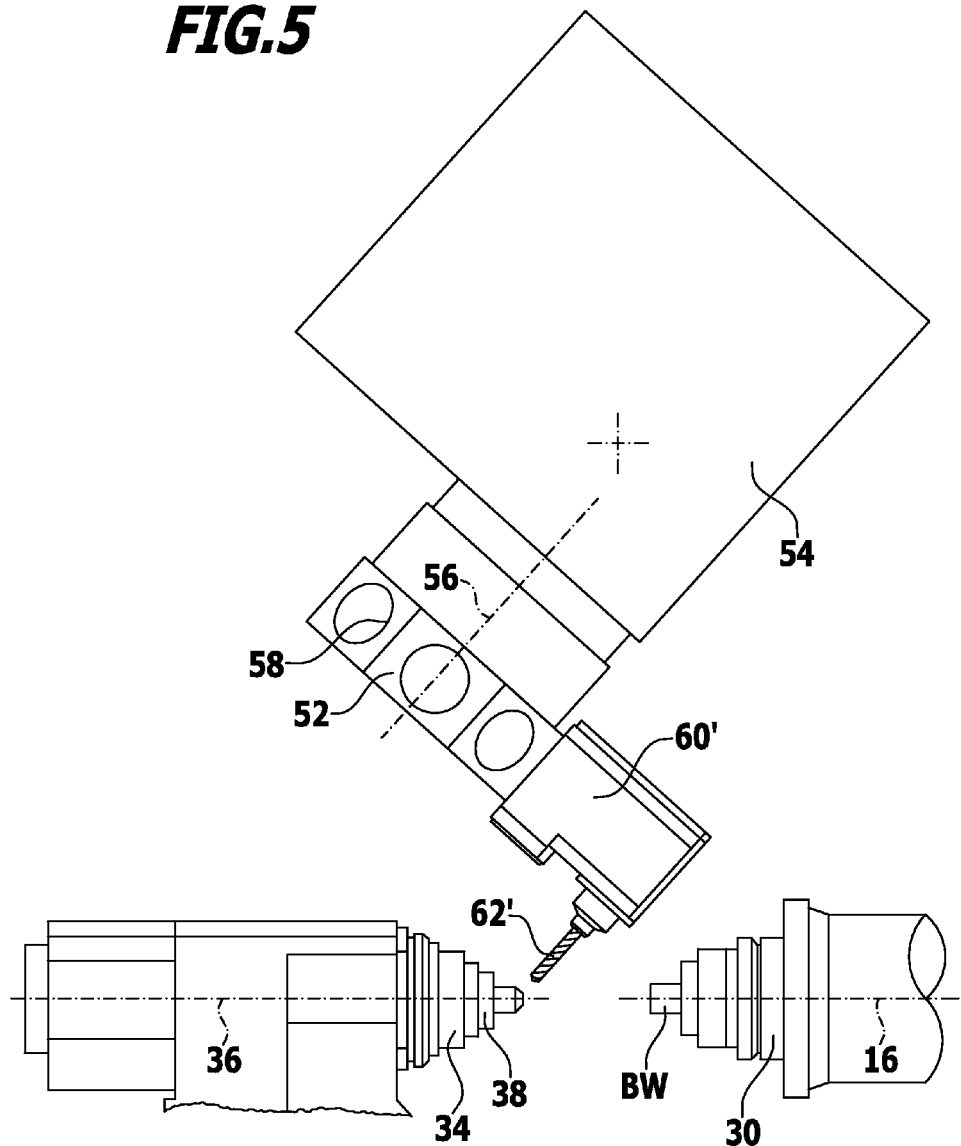
FIG. 5 shows a schematic illustration similar to FIG. 2 of an alignment of a tool at an acute angle relative to a second workpiece spindle axis of the counterspindle.

As illustrated in FIGS. 1 and 5, the slide system 72 comprises, for example, a Z slide 82 which can be moved in the Z direction relative to the machine frame 12.

A Y slide, which is designated as a whole as 84, is seated on this Z slide and an X slide, which is designated as a whole as 86 and can be moved in the X direction relative to the Y slide, is seated on the Y slide.

Figure 6:
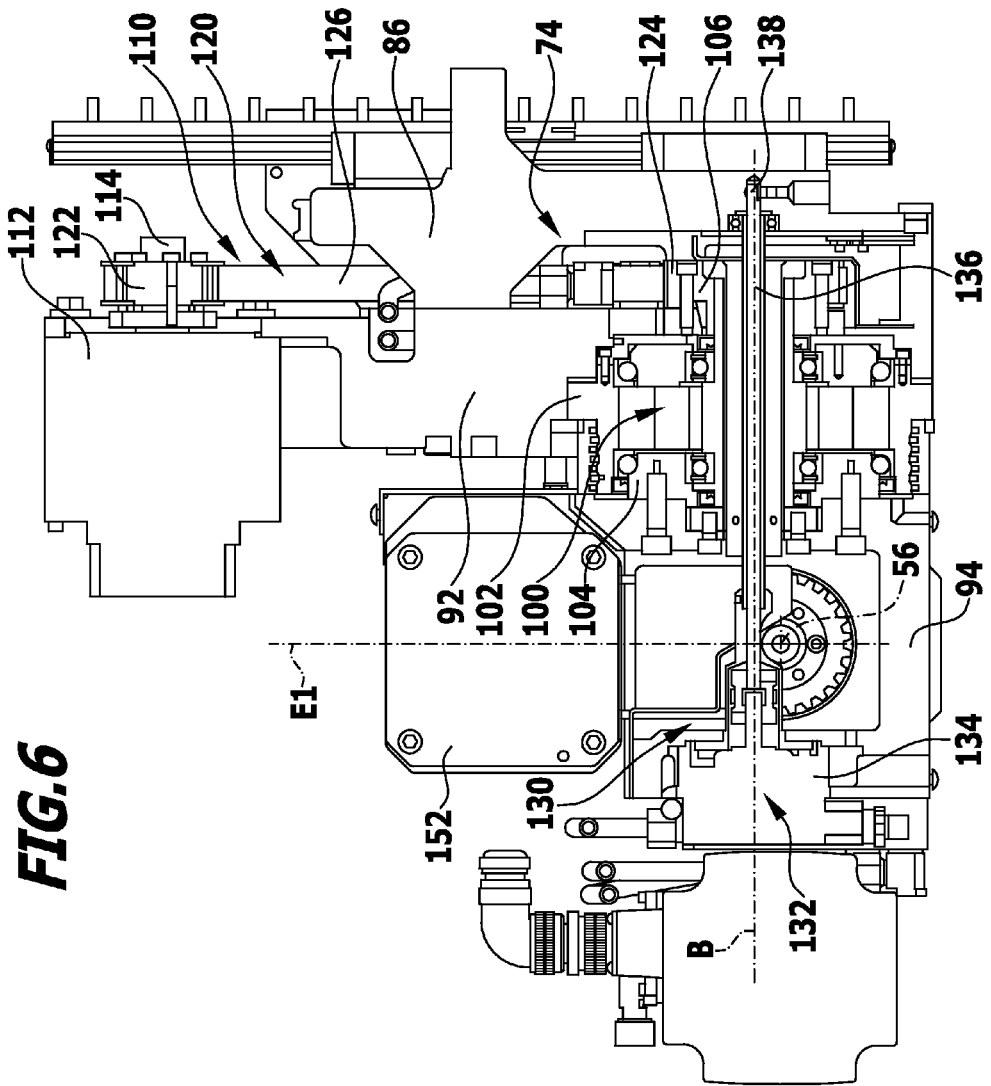
FIG. 6 shows a section through the tool turret and a rotary positioning system for the tool turret and FIG. 7 shows a section along line 7-7 in FIG. 6.
Figure 7:
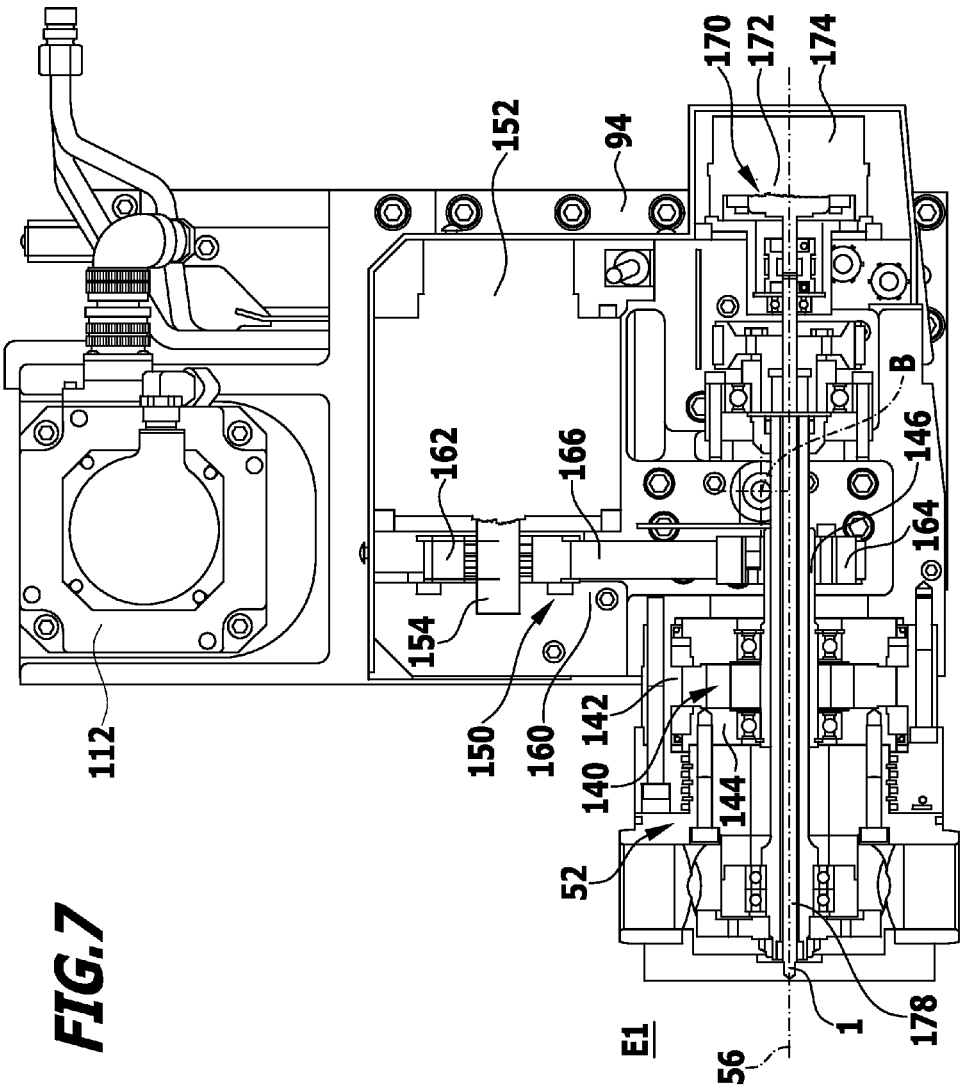

The X slide 86 comprises, for example, a rotary base 92 of the rotary positioning system 74, on which a turret housing support 94 is mounted for rotation about the B axis (FIGS. 1, 6, 7).

The mounting of the turret housing support 94 relative to the rotary base 92 is brought about by a transmission gear to slow which is designated as a whole as 100, is fixed in place on the rotary base 92 with a gear housing 102 and has a driven member 104 which is rotatable about the B axis and on which the turret housing support 94 is held and, therefore, is mounted relative to the gear housing 102.

Furthermore, the transmission gear 100 is driven via a drive shaft 106 of the transmission gear 100.

The drive shaft 106 can be driven by a rotary drive 110 which is connected to the rotary base 92 and comprises, for example, a drive motor 112 with a driven shaft 114 as well as a transfer gear unit 120 which is operative between the driven shaft 114 and the drive shaft 106, is designed, for example, as a belt drive and has a belt pulley 122 seated on the driven shaft 114 as well as a belt pulley 124 seated on the drive shaft 106 and a drive belt 126 running over both belt pulleys 122 and 124, wherein the transfer gear unit 120 is preferably designed as a toothed belt drive.

The transmission gear 100 is preferably a so-called cycloidal gear which operates, on the one hand, clearance-free and the rotary drive 110 is preferably a position-controlled rotary drive 110, with which it is possible to position the turret housing support 94 in optional rotary positions relative to the rotary base 92 in a step-less and position-controlled manner.

For the purpose of determining the rotary positions of the turret housing support 94 relative to the rotary base 92, a rotary position detection system 130 is provided which has, on the one hand, a rotary position sensor 132 which is, for example, seated securely with a housing 134 on the turret housing support 94, namely on a side thereof facing away from the rotary base 92 and is connected to the rotary base 92 via a rotary measuring shaft 136 which passes through the drive shaft 106 designed as a hollow shaft, wherein one end 138 of the rotary measuring shaft 136 is fixed non-rotatably to the rotary base 92. As a result, there is the possibility of a precise measurement of the rotary position of the turret housing support 94 relative to the rotary base 92 since the measurement of the rotary position is brought about free from any load-dependent deformations forming in the turret housing support 94 close to the drive.

As a result, the rotary position detection system 130 allows an exact determination of the B axis relative position of the turret housing support 94 in relation to the rotary base 92.

The rotary positioning system 74 therefore comprises the transmission gear 100, the rotary drive 110 as well as the rotary position detection system 130.

As illustrated in FIGS. 6 and 7, the turret axis 56 extends in a plane E1 (plane of drawing of FIG. 7) which is at right angles to the B axis and, therefore, at right angles to the axis of rotation, about which the turret housing support 94 can be rotated relative to the rotary base 92 in a step-less and position-controlled manner and can also be fixed in place by the position control in a step-less manner.

The turret head 52 is, for its part, mounted on the turret housing support 94 via a transmission gear to slow which is designated as a whole as 140, wherein the transmission gear 140 has a gear housing 142 which is securely connected to the turret housing support 94 and has a driven member 144 which is securely connected to the turret head 52. The transmission gear 140 can be driven by a drive shaft 146 which extends coaxially to the turret axis 56 and extends beyond the transmission gear 100 on a side facing away from the turret head 52.

The transmission gear 140 is driven via a rotary drive which is designated as a whole as 150, is arranged on the turret housing support 94 and comprises a drive motor 152, the driven shaft 154 of which is coupled to the drive shaft 146 by a transfer gear unit designated as a whole as 160, wherein the transfer gear unit 160 comprises a belt pulley 162 seated on the driven shaft 154 and a belt pulley 164 seated on the drive shaft 146, these belt pulleys being coupled to one another by a drive belt 166. The transfer gear unit 160 is preferably designed in the embodiment described above as a toothed belt drive.

The transmission gear 140 is also designed, for example, as a cyclo-gear or cycloidal gear which has, on the one hand, a large transmission to slow and can be driven by the rotary drive 150 in a step-less and position-controlled manner so that the rotary movements about the turret head 52 relative to the turret housing 54 about the turret axis 56 can be carried out relative to the turret housing support 94 in a step-less and position-controlled manner.

Furthermore, a rotary position detection system 170 is also provided for determining the rotary positions of the turret head 52 relative to the turret housing support 94 and this has a rotary position sensor 172, the housing 174 of which is mounted securely on the turret housing support 94 on a side facing away from the turret head 52, wherein the rotary position sensor 172 detects the rotary positions of the turret head 52 via a rotary measuring shaft 176 and the rotary measuring shaft 176 is connected non-rotatably to the turret head 52 with its end 178 facing away from the rotary position sensor 172. The rotary measuring shaft 176 extends coaxially to the turret axis 56 through the drive shaft 146 of the transmission gear 140 designed as a hollow shaft and extends coaxially to the turret axis 56.

As a result, the rotary position detection system 170 is in a position to determine the rotary positions of the turret head 52 relative to the turret housing support 94 exactly.

The transmission gear 140, the rotary drive 150 and the rotary position detection system 170 form a turret rotary positioning system 180, with which the turret head 52 can be rotated about the H axis in a step-less and position-controlled manner and also be secured in place by the position control in a step-less manner.

A control designated as a whole as 190 is associated with the lathe 10 and with this control the movements of the first workpiece spindle 14 and the second workpiece spindle 34 in the Z direction and in X direction, respectively, by means of the longitudinal guide system 20 and the slide system 40, respectively, as well as the movements of the turret head 52 in the directions X, Y and Z and the rotary movements about the B axis B, carried out by the turret movement system 70 with the slide system 72 and the rotary positioning system 74, as well as the rotary movements about the turret axis 56 designed as H axis, carried out by the turret rotary positioning system 180, can be controlled.

The control 190 is, in particular, in a position to carry out the rotary movements of the rotary positioning system 74 about the B axis in a step-less and position-controlled, in particular rotary position-controlled, manner as well as the rotary movements of the turret head 52 about the H axis in a step-less and position-controlled, in particular rotary position-controlled, manner so that the tools 62 can be optionally aligned relative to the machining area BW of the workpiece.

As illustrated, for example, in FIG. 2, a tool 62 may be aligned, on the one hand, exactly parallel to a plane E3 extending through the first workpiece spindle axis 16, namely, on the one hand, as a result of movement in the X, Y and Z axes and, on the other hand, as a result of a rotary movement about the turret axis 56 designed as H axis and, in addition, the angle between the tool 62 and the first workpiece spindle axis 16 can be determined exactly as a result of a rotary movement about the B axis in a step-less and optionally free manner.

As a result, either optional curved surfaces can be generated in the machining area BW of the workpiece or bores extending optionally relative to the first workpiece spindle axis 16 and, for example, intersecting it or also not intersecting it.

As illustrated in FIGS. 3 and 4, the lathe according to the invention is suitable, in particular, for generating bores in the workpiece W which extend exactly parallel to the first workpiece spindle axis 16 and can be introduced, for example, into an end side S of the workpiece W proceeding from this side, wherein the tool 62 designed as a drill may be aligned exactly parallel to the first workpiece spindle axis 16 and may also be guided in an exactly parallel alignment when a deep-hole bore is introduced into the workpiece W with the solution according to the invention as a result, on the one hand, of rotation of the turret head 52 about the H axis and, on the other hand, as a result of rotation of the turret housing 54 about the B axis.

In this respect, any faulty alignments of the tool 62 which are present with respect to the parallelism in relation to the first workpiece spindle axis 16 can be corrected to their full extent since, on the one hand, the H axis is located in a plane E1 at right angles to the B axis and can be moved about the B axis in this first plane E1 and, on the other hand, the tool 62 which represents a drilling tool extends in a second plane of alignment E2 which is at right angles to the H axis H and can be pivoted about the turret axis 56 in this second plane of alignment E2, wherein the first plane of alignment E1 and the second plane of alignment E2 are at right angles to one another and so, altogether, the drilling tool 62 can be aligned relative to any parallel line P in relation to the first spindle axis 16.

As illustrated in FIG. 5, it is also possible to carry out machining on the second workpiece W' which is held in the tool receptacle 38 of the second tool spindle 34 by means of a tool holder 60' which keeps the tool 62' aligned parallel to the H axis, wherein in this case, as well, the tool 62' can be aligned in the most varied of directions relative to the second workpiece spindle axis 36, in the same way as that described in conjunction with machining of the workpiece W.

The invention claimed is:

1. Lathe comprising
a machine frame,
a workpiece spindle arranged on the machine frame; a workpiece being rotatable about a workpiece spindle axis with said workpiece spindle,
a workpiece receptacle for a workpiece rotatable about the workpiece spindle axis,
at least one tool carrier system arranged on the machine frame and provided with a tool turret for accommodating a plurality of tools, wherein the tool turret comprises a turret housing and a turret head rotatable about a turret axis relative to said turret housing and bearing the tools,
at least one turret movement system, the turret housing of the tool turret and the workpiece receptacle being movable relative to one another at least in an X direction and a Z direction by means of said turret movement system,
a control, movement of the workpiece receptacle and the turret housing relative to one another being controllable with said control,
the turret movement system being provided with a B axis activatable by the control and that the turret axis is designed as an H axis extending in a plane at right angles to the B axis and activatable by the control,
wherein the rotation about the B axis is brought about by a rotary positioning system in a step-less and position-controlled manner, and
wherein the turret head is drivable and positionable about the H axis relative to the turret housing by a turret rotary positioning system in a step-less and position-controlled manner.

2. Machine tool as defined in claim 1, wherein the rotary positioning system has a position-controlled rotary drive driving a transmission gear bringing about a transmission to slow, the turret housing being rotatable by said transmission gear.

3. Machine tool as defined in claim 2, wherein the transmission gear rotatably mounts the turret housing on the turret movement system.

4. Machine tool as defined in claim 1, wherein the turret axis is located in a plane extending at right angles to the B axis.

5. Machine tool as defined in claim 1, wherein the movement space for the relative movement between a tool in operating position and the workpiece receptacle is selected such that the tool is adapted to be aligned exactly parallel to the workpiece spindle axis as a result of rotation about the B axis and about the H axis.

6. Machine tool as defined in claim 1, wherein the turret rotary positioning system has a position-controlled rotary drive driving a transmission gear bringing about a transmission to slow, the turret head being rotatable about the turret axis by means of said transmission gear.

7. Machine tool as defined in claim 6, wherein the transmission gear rotatably mounts the turret head on the turret housing.

8. Machine tool as defined in claim 1, wherein the transmission gear to slow is a cam gear, in particular a cycloidal gear.

9. Machine tool as defined in claim 1, wherein the turret axis extends at a distance from the B axis.

10. Machine tool as defined in claim 1, wherein a movement space for the relative movement between a tool in operating position and the workpiece receptacle is selected such that the tool is movable into a position as a result of rotation about the B axis and about the H axis, the tool being able to form an acute angle with the workpiece spindle axis in said position in all the planes extending through said workpiece spindle axis.

* * * * *